(12) United States Patent
Mizobuchi et al.

(10) Patent No.: US 10,252,482 B2
(45) Date of Patent: Apr. 9, 2019

(54) BELT PRESS

(71) Applicant: ISHIGAKI COMPANY LIMITED, Tokyo (JP)

(72) Inventors: Katsunobu Mizobuchi, Kagawa (JP); Takahiko Ishimaru, Kagawa (JP); Toshifumi Ohgihata, Kagawa (JP)

(73) Assignee: ISHIGAKI COMPANY LIMITED, Tokyo (JP)

( * ) Notice: Subject to any disclaimer, the term of this patent is extended or adjusted under 35 U.S.C. 154(b) by 377 days.

(21) Appl. No.: 15/029,380

(22) PCT Filed: Oct. 10, 2014

(86) PCT No.: PCT/JP2014/077174
§ 371 (c)(1),
(2) Date: Apr. 14, 2016

(87) PCT Pub. No.: WO2015/060146
PCT Pub. Date: Apr. 30, 2015

(65) Prior Publication Data
US 2016/0221290 A1    Aug. 4, 2016

(30) Foreign Application Priority Data

Oct. 21, 2013   (JP) .................................. 2013-217968

(51) Int. Cl.
*B30B 9/24*     (2006.01)
*B30B 9/26*     (2006.01)
(Continued)

(52) U.S. Cl.
CPC ............ *B30B 9/246* (2013.01); *B01D 33/042* (2013.01); *B01D 33/646* (2013.01); *B30B 9/24* (2013.01);
(Continued)

(58) Field of Classification Search
CPC .. B30B 5/04; B30B 5/06; B30B 5/065; B30B 5/067; B30B 9/24; B30B 9/241;
(Continued)

(56) References Cited

U.S. PATENT DOCUMENTS 3,896,030 A * 7/1975 Bahr .................... B01D 33/042
                                                                210/384
4,019,431 A * 4/1977 Bastgen ............... B01D 33/042
                                                                100/118
(Continued)

FOREIGN PATENT DOCUMENTS

CN          102470290          5/2012
GB          1326507            8/1973
(Continued)

OTHER PUBLICATIONS

Official Action issued in CN Appl. No. 201480057928.1 dated Jun. 16, 2017.
(Continued)

*Primary Examiner* — Shelley Self
*Assistant Examiner* — Katie L Parr
(74) *Attorney, Agent, or Firm* — Greenblum & Bernstein, P.L.C.

(57) ABSTRACT

A pair of filter cloths is wound around a first roll a plurality of times by being wound around the first roll, then being wound around a second roll to return to a space between the first roll and the pair of filter cloths wound around the first roll, and being wound around the first roll again. The pair of filter cloths wound around the first roll the plurality of times applies a pressing force to the first roll.

1 Claim, 10 Drawing Sheets

(51) Int. Cl.
  *B01D 33/04* (2006.01)
  *B01D 33/64* (2006.01)
  *C02F 11/123* (2019.01)
(52) U.S. Cl.
  CPC ............ *B30B 9/265* (2013.01); *C02F 11/123* (2013.01); *B30B 9/243* (2013.01); *B30B 9/247* (2013.01)
(58) Field of Classification Search
  CPC ......... B30B 9/243; B30B 9/245; B30B 9/246; B30B 3/005; B30B 7/00; B01D 33/03
  USPC .................. 100/121, 151, 153, 306, 307
  See application file for complete search history.

(56) References Cited

U.S. PATENT DOCUMENTS

| | | | |
|---|---|---|---|
| 4,144,807 A | 3/1979 | Bastgen | |
| 4,168,236 A * | 9/1979 | Bahr | B01D 33/03 210/294 |
| 4,266,474 A * | 5/1981 | Bahr | B01D 33/042 100/118 |
| 4,475,453 A * | 10/1984 | Davis | B30B 9/246 100/118 |
| 4,543,880 A * | 10/1985 | Svensson | B30B 9/246 100/118 |
| 4,877,487 A * | 10/1989 | Miller | B30B 5/04 162/360.3 |
| 5,223,071 A * | 6/1993 | Gersbeck | B27N 3/26 100/313 |
| 5,393,424 A | 2/1995 | Liang | |
| 7,964,105 B2 * | 6/2011 | Moss | B01D 33/042 210/770 |

FOREIGN PATENT DOCUMENTS

| | | | |
|---|---|---|---|
| GB | 1470682 | | 4/1977 |
| JP | 56-80398 | | 7/1981 |
| JP | 56080398 A | * | 7/1981 |
| JP | 56-126417 | | 10/1981 |
| JP | 57-184500 | | 11/1982 |
| JP | 60-49893 | | 3/1985 |
| JP | 7-178398 | | 7/1995 |
| JP | 8-21684 | | 1/1996 |

OTHER PUBLICATIONS

International Search Report for PCT/JP2014/077174 dated Nov. 11, 2014.
Office Action issued in China Counterpart Patent Appl. No. 201480057928.1, dated Jan. 24, 2018.
Official Action issued in Taiwanese Pat. Appl. No. 103136159 dated Aug. 21, 2017.

* cited by examiner

BELT PRESS

TECHNICAL FIELD

The present invention relates to a belt press which performs dewatering.

BACKGROUND ART

As belt presses which perform dewatering by use of a filter cloth wound around rolls, there are a type of belt press including many rolls which are arranged vertically and horizontally and around which a filter cloth is wound, a type of belt press equipped with a pressure applying device in which a filter cloth is wound around a large-diameter roll, and is pressed from above by using a pressure applying belt or a pressure applying roll, and other types. Patent Literature 1 discloses a belt press in which a filter cloth wound around a periphery of a center roll is folded back with a pressure applying roll. Then, the folded portion of the filter cloth is wound around the center roll again with pressure applying rolls interposed between the doubled portions of the filter cloth, and transmits tension to the pressure applying rolls to adjust applied pressure.

CITATION LIST

Patent Literature

[PTL 1] Japanese Patent Application Publication No. Sho 57-184500

SUMMARY OF INVENTION

In the aforementioned belt press, many rolls are arranged to perform dewatering by use of shear force, surface pressure, and filter cloth tension at portions of the cloth wound around the rolls. Moreover, the aforementioned belt press is large in apparatus size because the press uses an increased number of rolls and a long filter cloth in order to secure dewatering time. The pressure applying device such as the pressure applying belt is a complex device, and requires high cost due to high price and the cost of maintenance and consumables. Moreover, the aforementioned belt press can apply only low pressure, and therefore cannot achieve sufficient filtering performance.

The belt press disclosed in Patent Literature 1 dewaters sludge by holding the sludge between a single filter cloth and a roll, and the dewatering is performed only in a portion of the filter cloth in contact with the main roll. Accordingly, after passing the portion of the filter cloth folded back with the pressure applying roll in the final stage, the cake is merely discharged due to the structure of the apparatus. Since the dewatering time is equal to the time in which the filter cloth and the roll are in contact with each other, the dewatering time is short and sufficient dewatering cannot be performed. In the squeezing process, since the pressure abruptly increases at a portion of the filter cloth with which the pressure applying roll comes into contact, the sludge with a high water content ratio is abruptly squeezed at high pressure, and causes side leak. Accordingly, such a belt press cannot perform ideal dewatering such as gradual dewatering.

An object of the present invention is to provide a compact belt press in which a traveling distance of a pair of filter cloths and dewatering time are sufficient and which can perform dewatering at high pressure.

A belt press in accordance with some embodiments includes: a rotatable first roll; a rotatable second roll; and a pair of filter cloths wound travelably around the first roll and the second roll and configured to squeeze and dewater sludge supplied between filter cloths of the pair of filter cloths. The pair of filter cloths is wound around the first roll a plurality of times by being wound around the first roll, then being wound around the second roll to return to a space between the first roll and the pair of filter cloths wound around the first roll, and being wound around the first roll again. The pair of filter cloths wound around the first roll the plurality of times applies a pressing force to the first roll.

In the configuration described above, squeezing force is increased by winding the pair of filter cloths around the first roll (center roll) being the center multiple times via the second roll (return roll) and thereby utilizing tension of the pair of filter cloths as pressing force of a pressure applying mechanism, i.e. applying pressing force of the pair of filter cloths toward the first roll (center roll). Accordingly, dewatering can be performed at high pressure with a traveling distance of the pair of filter cloths and dewatering time being sufficient. Moreover, there is no need to arrange many rolls to increase the dewatering time, and a compact apparatus can be achieved.

The belt press may further include a plurality of intermediate members arranged between portions of the pair of filter cloths wound around the first roll the plurality of times and being movable close to and away from a circumferential surface of the first roll.

In the configuration described above, the pressing force is applied by the pair of filter cloths in an outer portion which is wound around the intermediate members (for example, intermediate rolls), and the highest pressure is applied to the pair of filter cloths in an inner portion which is in contact with the first roll (center roll). Accordingly, it is possible to perform dewatering in which the pressure increases gradually and no side leak occurs.

Each of the plurality of intermediate members may be a rotatable roll, and arrangement intervals between the plurality of intermediate members and roll diameters of the plurality of intermediate members may gradually increase toward a discharge portion for discharging the sludge from the pair of filter cloths.

In the configuration described above, the pressure applied to the pair of filter cloths in contact with the intermediate members (for example, intermediate rolls) can be increased stepwise.

The belt press may further include a plurality of rotatable third rolls in contact with the first roll. The pair of filter cloths may be wound around the first roll with the third rolls interposed between the first roll and the pair of filter cloths, and the third rolls may be offset from movement lines of the intermediate members in an adjacent stage.

In the configuration described above, the third rolls (pressure reducing rolls) can reduce the pressing force applied by the intermediate members (for example, intermediate rolls), and the squeezing pressure can be adjusted.

The intermediate members may be offset from movement lines of the intermediate members in an adjacent stage.

In the configuration described above, variation in the pressure applied to the pair of filter cloths wound in multiple stages can be reduced.

The belt press may further include a frame standing upright at both ends of the first roll and supporting the intermediate members. The frame may have supporting holes into which the intermediate members are insertable and by which the intermediate members are movably supported.

In the configuration described above, the intermediate members (for example, intermediate rolls) are supported to be capable of moving close to and away from the circumferential surface of the first roll (center roll).

Accordingly, the intermediate members (for example, intermediate rolls) are movable along radial lines from the center of the first roll (center roll), and the pressing force is thus applied to the pair of filter cloths in the inner portion which is in contact with the first roll (center roll) by the pair of filter cloths in the outer portion which is wound around the intermediate members (for example, intermediate rolls). Similarly, winding the returning pair of filter cloths around the first roll (center roll) multiple times allows higher pressing force to be applied to the pair of filter cloths in contact with the first roll (center roll) by an amount corresponding to the number of times the pair of filter cloths is wound around the first roll. Since the pair of filter cloths wound in the outer portion applies pressing force to the pair of filter cloths wound in the inner portion, the pressure gradually increases from the outer portion to the inner portion. Accordingly, the pair of filter cloths in the innermost portion which is wound around the first roll (center roll) is squeezed at the highest pressure. Causing a portion of the pair of filter cloths to travel from the outer portion to the inner portion causes the squeezing pressure to increase stepwise, and ideal dewatering without side leak can be performed.

Moreover, in the configuration described above, the dewatering time can be extended by increasing the number of times the pair of filter cloths is wound around the first roll (center roll), and there is no need to secure traveling time of the pair of filter cloths by arranging many other second rolls. According, the apparatus is compact and the pair of filter cloths is short. Moreover, since the intermediate members (for example, intermediate rolls) for reducing friction between portions of the filter cloths are arranged between portions of the pair of filter cloths wound around the first roll (center roll), the pair of filter cloths can travel smoothly. The pressure at a certain position can be adjusted by changing the sizes, shapes, and arranged positions of the intermediate members (for example, intermediate rolls).

DESCRIPTION OF EMBODIMENTS (Belt Press)

Figure 1:
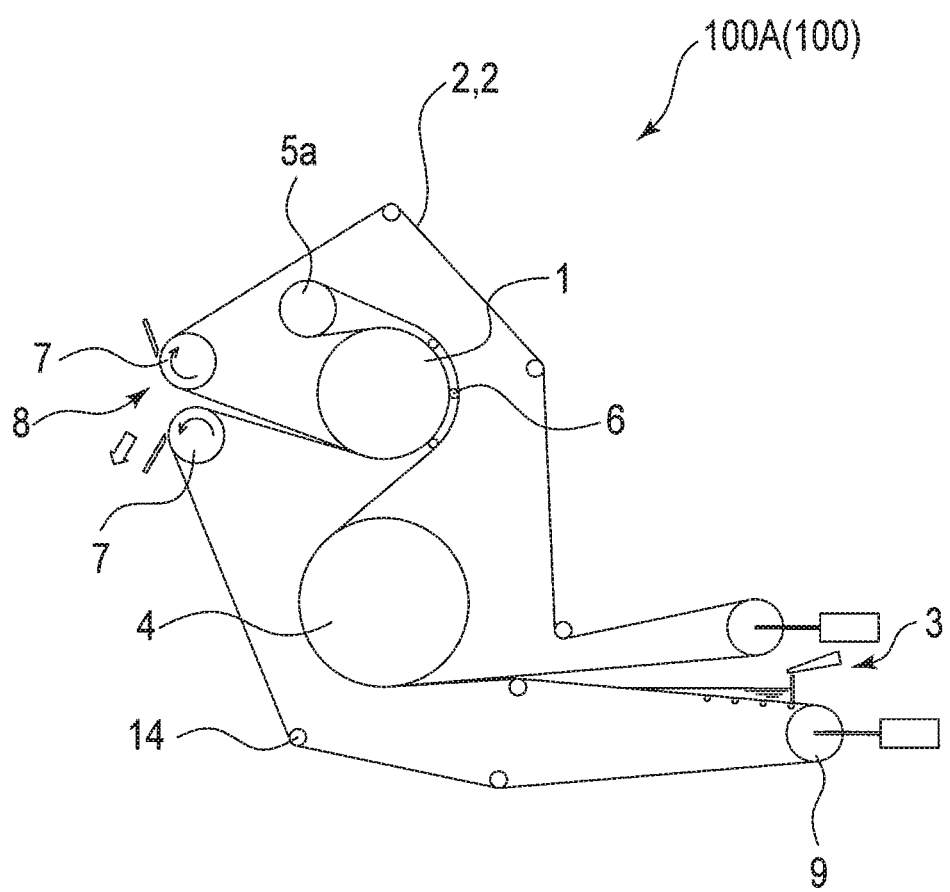
FIG. 1 is a schematic side view of a double-wound belt press in a first embodiment of the present invention.

A belt press 100 (100A to 100F) in embodiments of the present invention includes a pair of upper and lower filter cloths 2, 2, multiple rolls 14 for providing the pair of filter cloths 2, 2 in an endless and tensioned state, and a frame supporting the pair of upper and lower filter cloths 2, 2 and the multiple rolls 14, and dewaters sludge between the filter cloths of the pair of filter cloths 2, 2. The belt press 100 (100A to 100F) includes a mechanism which includes the pair of filter cloths 2, 2 wound around a center roll 1 multiple times, and thereby is able to dewater the sludge while applying high pressure to the pair of filter cloths 2, 2. Intermediate members for reducing friction between the filter cloths are arranged between the filter cloth 2 and the filter cloth 2 each forming one of multifold portions of the pair of filter cloths 2, 2 wound around multiple times. The intermediate members are movable along radial lines from the center of the center roll 1. The intermediate members transmit pressing force of the pair of filter cloths 2, 2 wound around the intermediate members to the pair of filter cloths 2, 2 in an inner portion, and apply pressure thereto. The dewatering of sludge is performed by causing the pair of filter cloths 2, 2 to travel in such a way as to be wound around the intermediate members and then around the center roll 1.

(Double Wound)

FIG. 1 is a schematic side view of a double-wound belt press 100A in a first embodiment of the present invention. In the belt press 100A, a pair of filter cloths 2, 2 is wound around a center roll 1 twice. The belt press 100A includes: a sludge supplying portion 3 which supplies sludge; the pair of upper and lower endless filter cloths 2, 2 which holds the sludge therebetween and dewaters the sludge; the center roll 1 around which the pair of filter cloths 2, 2 is wound twice; a shear roll 4 which guides the pair of filter cloths 2, 2 to the center roll 1; a return roll 5a around which the pair of filter cloths 2, 2 is wound to return toward the center roll 1 again; multiple intermediate members which are arranged between double portions of the pair of filter cloths 2, 2 facing each other and traveling on the center roll 1; two drive rolls 7 which drive the pair of filter cloths 2, 2; a discharge portion 8 which discharges the sludge; and tension rolls 9 which adjust the tension of the pair of filter cloths 2, 2. The adjustment of the tension of the pair of filter cloths 2, 2 can be performed by employing a publicly-known filter cloth tension device.

The multiple intermediate members are arranged at the same distance from the center roll 1, and are arranged to be movable along radial lines from the center of the center roll 1. The pair of filter cloths 2, 2 is wound around the intermediate members from the outside thereof, and is then subsequently wound around the return roll 5a to return to the center roll 1. The returning pair of filter cloths 2, 2 passes inside the intermediate members and are wound around the center roll 1 to come into contact therewith. A configuration in which the pair of filter cloths 2, 2 is wound around the center roll 1 twice with the intermediate members provided between the double portions is thereby achieved.

(Intermediate Members)

A publicly-known technique capable of reducing friction between the double portions of the pair of filter cloths 2, 2 can be employed for the intermediate members. In the first embodiment, rotatable cylindrical rolls are used as the intermediate members. Hereafter, the rolls used as the intermediate members are referred to as intermediate rolls 6. Since the rotating direction of the intermediate rolls 6 coincides with the traveling direction of the pair of filter cloths 2, 2, the friction of the pair of filter cloths 2, 2 is greatly reduced. Moreover, since filtrate is discharged from a gap between portions of the pair of filter cloths 2, 2 formed by the intermediate rolls 6, multiple rolls may be used as the intermediate rolls 6. The intermediate rolls 6 are arranged to be movable along radial lines from the center of the center roll 1. Pressure is thus applied to the pair of filter cloths 2, 2 in contact with the center roll 1 in an inner portion, via the intermediate rolls 6 due to tension of the pair of filter cloths 2, 2 traveling outside the intermediate rolls 6. Accordingly, in addition to surface pressure of the center roll 1, linear pressure produced by pressing force of the intermediate rolls 6 is applied to the pair of filter cloths 2, 2 in contact with the center roll 1 in the inner portion, and dewatering is thus performed at high pressure. Moreover, in the first embodiment, although the moving directions of the intermediate rolls 6 are radial directions, the moving directions may be radial curve directions or the like and be any moving directions as long as the intermediate rolls 6 are capable of moving close to and away from a circumferential surface of the center roll 1.

Using small-diameter rolls as multiple intermediate rolls 6 and arranging the rolls at short intervals causes the linear pressure of the intermediate rolls 6 to be applied continuously, and the pressure can be evenly applied to the pair of filter cloths 2, 2 in contact with the center roll 1. Long squeezing time can be achieved by arranging many intermediate rolls 6 in a circumferential direction and making a section in which the intermediate rolls 6 come into contact with the pair of filter cloths 2, 2 long. Accordingly, an operation suitable for sludge with poor dewaterability can be performed. As described above, the size, arrangement intervals, and the like of the intermediate rolls 6 can be changed as appropriate, according to sludge to be treated.

Since the intermediate rolls 6 are movable, workability in the case of winding the pair of filter cloths 2, 2 around the rolls is excellent. Although the movement of the intermediate rolls 6 are limited by a later-described frame 10 (see FIG. 10) supporting the intermediate rolls 6, the operations and effects of the present invention can be obtained as long as the intermediate rolls 6 are supported to be movable by an amount corresponding to the thickness of the pair of filter cloths 2, 2 and the supplied sludge.

Alternatively, a resin sheet with low friction resistance can be used as the intermediate member 6. The resin sheet is arranged between portions of the pair of filter cloths 2, 2 and the pair of filter cloths 2, 2 is made to slide and travel on the resin sheet. Since the resin sheet applies surface pressure to the pair of filter cloths 2, 2 in contact with the center roll 1 in the inner portion, dewatering can be performed more evenly.

(Details of Double Wound)

Figure 2:
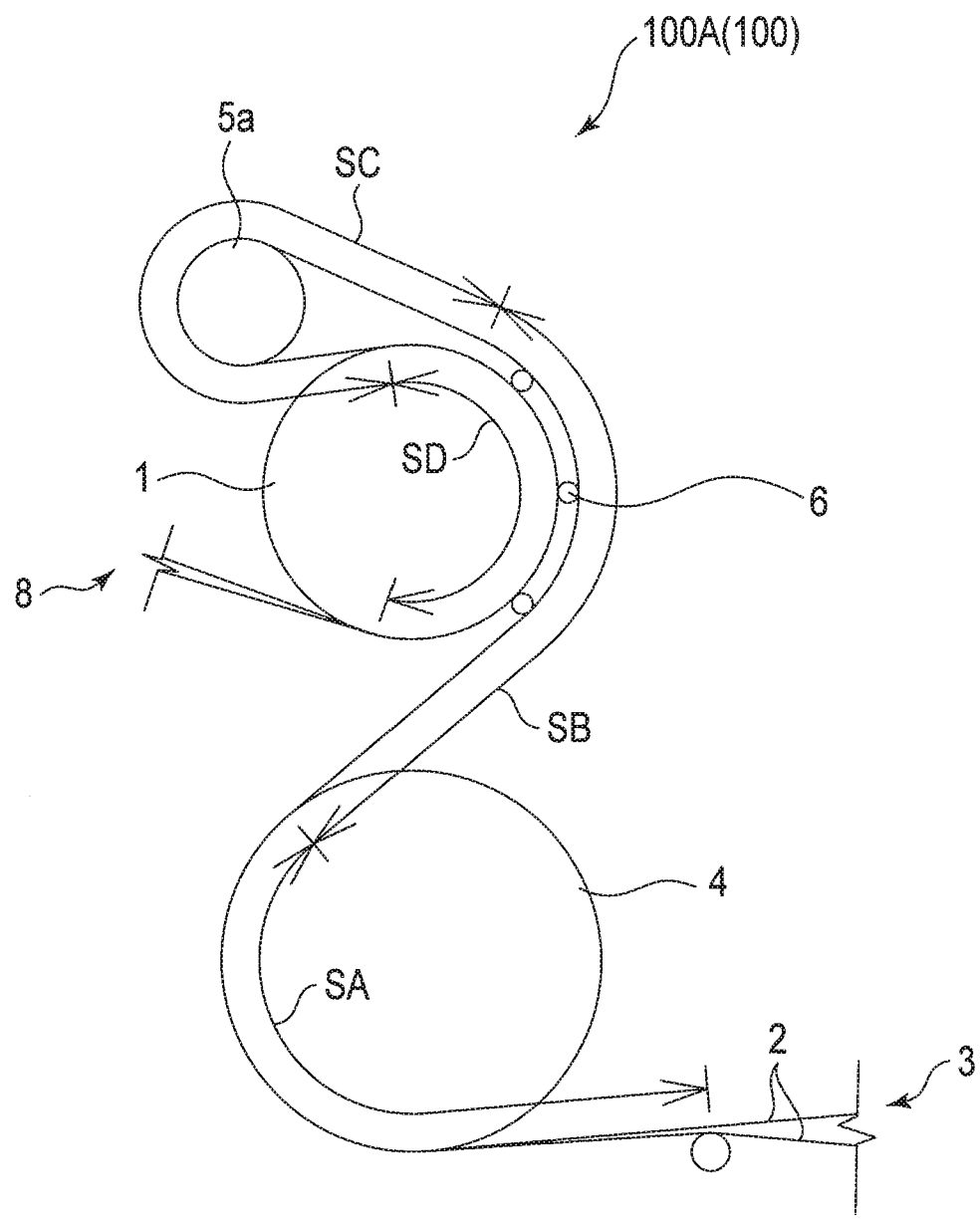
FIG. 2 is a side view of a main portion of the double-wound belt press in the first embodiment of the present invention.

FIG. 2 is a side view of a main portion of the double-wound belt press 100A. Dewatering stages of the belt press 100A include a filtering stage SA, a pressing stage SB, a returning stage SC, and a squeezing stage SD.

In the filtering stage SA, the sludge supplied by the sludge supplying portion 3 is held by and between the filter cloth 2 and the filter cloth 2, and the pair of filter cloths 2, 2 is wound around the shear roll 4. Since the filter cloth 2 and the filter cloth 2 gradually come close to each other toward the shear roll 4, filtering is gradually performed also for sludge with high fluidity. Since the traveling speed of the filter cloth 2 traveling on the inner side out of the pair of filter cloths 2, 2 wound around the shear roll 4 is faster, shear force is generated inside. Accordingly, in the filtering stage SA, surface pressure produced by the shear roll 4 and the shear force of the filter cloth 2 and the filter cloth 2 are applied to the sludge, and liquid in the sludge is discharged outside through the filter cloth 2 and the filter cloth 2. The diameter of the shear roll 4 is set as appropriate according to a water content ratio and sludge properties required in the squeezing stage SD which is the latter stage.

In the pressing stage SB, the pair of filter cloths 2, 2 guided from the shear roll 4 is wound around the multiple intermediate rolls 6. The intermediate rolls 6 have the same diameter and are arranged at equal intervals. In the pressing stage SB, the surface pressure produced by the intermediate rolls 6 are applied to the sludge at positions where the intermediate rolls 6 come into contact with the pair of filter cloths 2, 2 and the tension acting on the pair of filter cloths 2, 2 is applied to the sludge in other areas to dewater the sludge. Since the intermediate rolls 6 are arranged to be movable radially toward the center of the center roll 1, the tension acting on the pair of filter cloths 2, 2 wound in the outer portion in the pressing stage SB presses the pair of filter cloths 2, 2 in contact with the center roll 1 in the inner portion toward the center via the intermediate rolls 6. Moreover, as in the filter cloth 2 and the filter cloth 2 in the filtering stage SA, shear force is also applied to the sludge to dewater the sludge. Filtrate discharged in the pressing stage SB is discharged also from the gap formed by the intermediate rolls 6.

In the returning stage SC, the pair of filter cloths 2, 2 wound around the intermediate rolls 6 are wound around the return roll 5a and is made to return toward the center roll 1. The pair of filter cloths 2, 2 wound around the return roll 5a from the outside thereof and folded back is made to travel toward the inner side of the intermediate rolls 6. Reducing the diameter of the return roll 5a increases shear force in a wound-around portion and promotes dewatering.

In the squeezing stage SD, the pair of filter cloths 2, 2 returning from the return roll 5a is wound around the center roll 1 to come into contact therewith and is made to travel while being held by and between the center roll 1 and the intermediate rolls 6. The pair of filter cloths 2, 2 receives surface pressure by being wound around the center roll 1. Furthermore, since the tension applied in the pressing stage SB presses the intermediate rolls 6 toward the center roll 1, the pressing force in the pressing stage SB is also transmitted to the pair of filter cloths 2, 2 in the squeezing stage SD, and the squeezing of the sludge is performed with the linear pressure produced by the center roll 1 and the intermediate rolls 6 being applied to the sludge. Accordingly, dewatering is performed in the squeezing stage SD at the highest pressure in the dewatering stages. Filtrate is discharged from the gap formed by the intermediate rolls 6 and a small gap between the center roll 1 and the pair of filter cloths 2, 2. Moreover, in the pair of filter cloths 2, 2 in the squeezing stage SD which is in contact with the center roll 1 in the inner portion, as in the pair of filter cloths 2, 2 in the pressing stage SB, shear force is also applied to the sludge to dewater the sludge.

Since the pressure increases stepwise from the filtering stage SA to the squeezing stage SD, side leakage of the sludge held by and between the filter cloth 2 and the filter cloth 2 does not occur and dewatering can be performed such that a cake water content ratio becomes lowest in the pair of filter cloths 2, 2 in the squeezing stage SD which is in contact with the center roll 1. The paired filter cloths 2, 2 having passed the squeezing stage SD are separated from each other and wound around the upper and lower drive rolls 7, 7, respectively, to discharge cake in the discharge portion 8, and are then wound to be endless.

(Double-Wound Gradual Increase Design)

Figure 3:
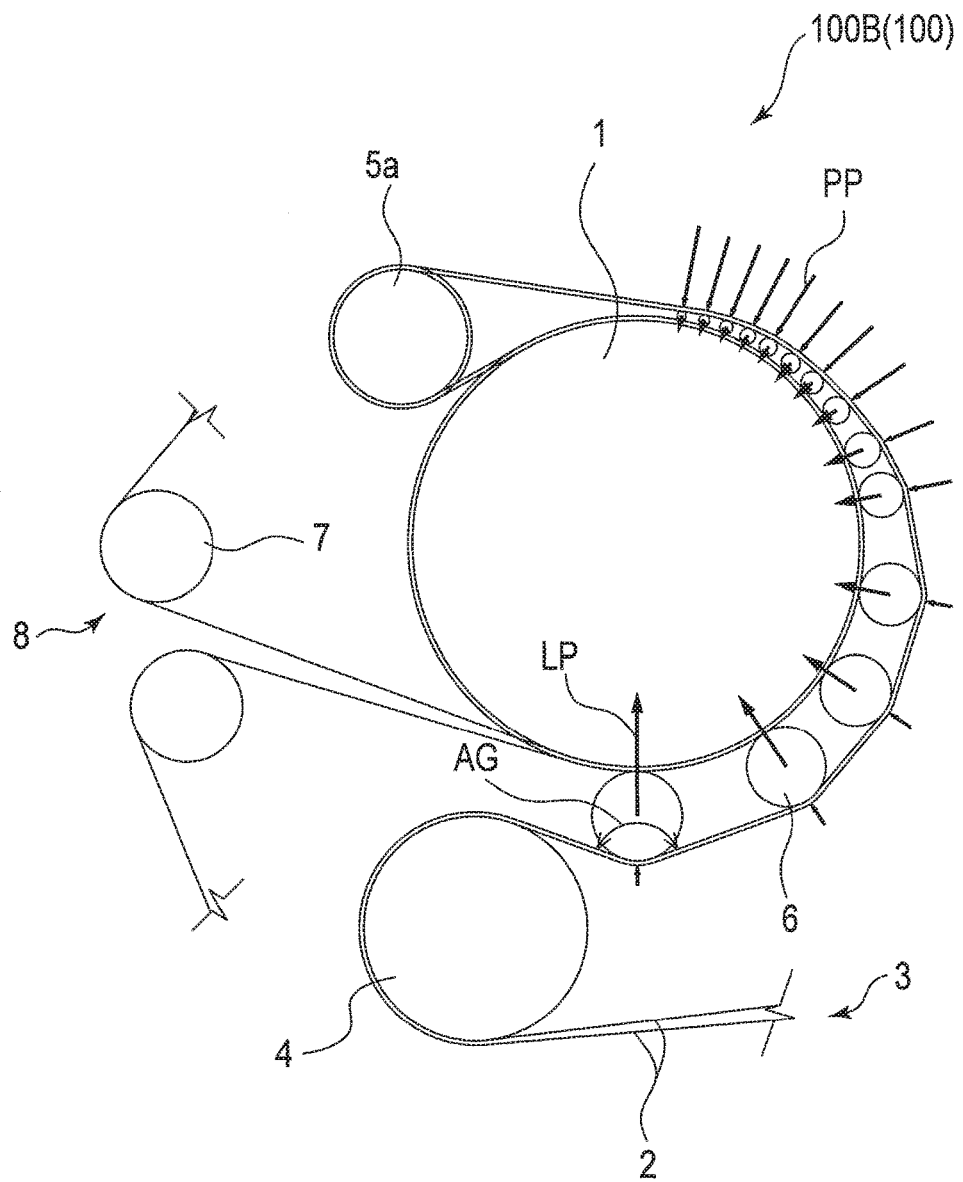
FIG. 3 is a side view of a main portion of a double-wound pressure gradual increase type belt press in a second embodiment of the present invention.

In the first embodiment illustrated in FIGS. 1 and 2, the intermediate rolls 6 having the same size and arranged at equal intervals are used as the intermediate members. However, an operation suiting a certain purpose can be achieved by changing the configuration of the intermediate members. FIG. 3 is a side view of a main portion of a double-wound pressure gradual increase type belt press 100B in a second embodiment of the present invention. The belt press 100B has the same configuration as that in the first embodiment, except for the contents particularly described below. Moreover, dewatering stages include a filtering stage SA, a pressing stage SB, a returning stage SC, and a squeezing stage SD as in FIG. 2. In the pressure gradual increase type belt press 100B, filtration pressure is gradually increased by a configuration of intermediate rolls 6. The utilized intermediate rolls 6 are arranged such that the diameters of the rolls and the intervals between the arranged rolls increase stepwise from the start position to the end position of a squeezing operation in the squeezing stage SD which is the final stage. Specifically, the diameters of the intermediate rolls 6 increase stepwise toward a discharge portion 8 such that the first intermediate roll 6 in the squeezing stage SD which comes into contact with a pair of filter cloths 2, 2 is the smallest intermediate roll 6 and the intermediate roll 6 on the discharge side of the pair of filter cloths 2, 2 is the largest intermediate roll 6, and the intermediate rolls 6 are arranged such that the intervals between the intermediate rolls 6 increase with this increase in sizes.

In the filtering stage SA, dewatering is performed as in the normal double-wound belt press. In the pressing stage SB, one portion of the pair of filter cloths 2, 2 travels to first come into contact with the largest-diameter intermediate roll 6 and then sequentially come into contact with the smaller-diameter intermediate rolls 6. In the pressing stage SB, although the tension acting on the pair of filter cloths 2, 2 is even, surface pressure PP applied to the one portion of the pair of filter cloths 2, 2 increases as the diameter of the intermediate roll 6 in contact with the one portion of the pair of filter cloths 2, 2 becomes smaller. In the returning stage SC, the pair of filter cloths 2, 2 is made to return as in the normal double-wound belt press. In the squeezing stage SD, one portion of the pair of filter cloths 2, 2 is pressed by the small-diameter intermediate roll 6 first and then sequentially by the larger-diameter intermediate rolls 6.

When pressure is applied to the pair of filter cloths 2, 2 in contact with the center roll 1, via the intermediate rolls 6, the applied pressure varies depending on the diameters and arrangement intervals of the intermediate rolls 6. When the small-diameter intermediate rolls 6 are arranged at short intervals, a wound angle AG of the pair of filter cloths 2, 2 wound around one intermediate roll 6 is great. Since the pressing force toward the center roll 1 is small when the wound angle AG is great, linear pressure LP applied to the pair of filter cloths 2, 2 in contact with the center roll 1 by the intermediate roll 6 is small. Meanwhile, when the large-diameter intermediate rolls 6 are arranged at long intervals, the wound angle AG of the pair of filter cloths 2, 2 wound around one intermediate roll 6 is small, and the pressing force toward the center roll 1 is great. Accordingly, the linear pressure LP applied to the pair of filter cloths 2, 2 in contact with the center roll 1 by the large intermediate roll 6 is great. Hence, arranging the intermediate rolls 6 such that the diameters and intervals thereof gradually increase toward the discharge side causes the pair of filter cloths 2, 2 interposed between the center roll 1 and the intermediate rolls 6 to receive the greatest linear pressure LP on the sludge discharge side.

(Double-Wound Low-Pressure Design)

Figure 4:
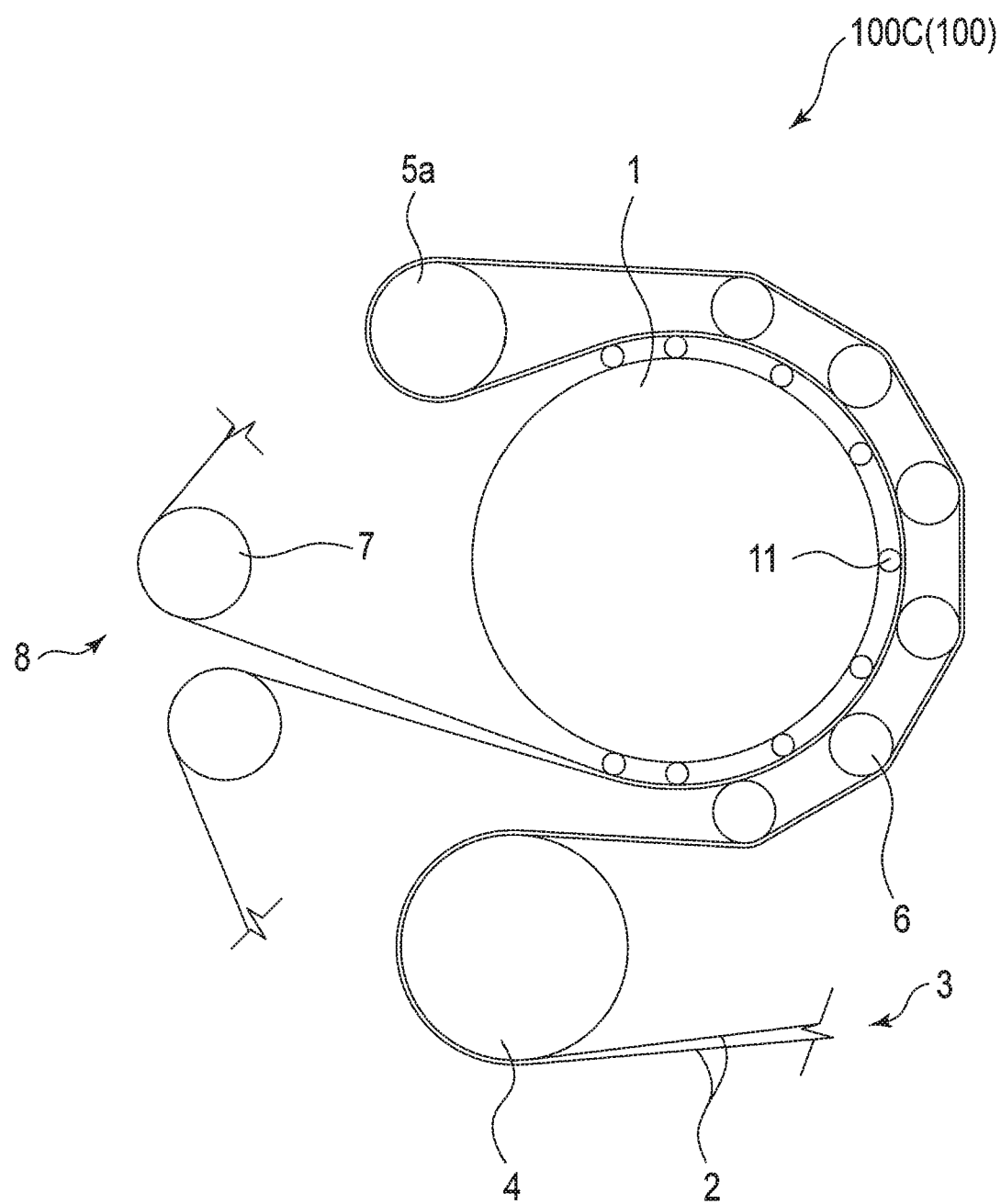
FIG. 4 is a side view of a main portion of a double-wound low-pressure design type belt press in a third embodiment of the present invention.

FIG. 4 is a side view of a main portion of a double-wound low-pressure design type belt press 100C in a third embodiment of the present invention. The belt press 100C has the same configuration as that in the first embodiment, except for the contents particularly described below. Moreover, dewatering stages include a filtering stage SA, a pressing stage SB, a returning stage SC, and a squeezing stage SD as in FIG. 2. In the low-pressure design type belt press 100C, the sizes of intermediate rolls 6 are the same, and multiple pressure reducing rolls 11 are rotatably arranged between a center roll 1 and a pair of filter cloths 2, 2 which is in contact with the center roll 1 in the above description. Moreover, the pressure reducing rolls 11 and the intermediate rolls 6 are arranged in zigzag, and no pressure reducing rolls 11 are arranged on movement lines of the intermediate rolls 6. In other words, the pressure reducing rolls 11 are arranged to be offset from the movement lines of the intermediate rolls 6. In the third embodiment, the pressure reducing rolls 11 and the intermediate rolls 6 are arranged in zigzag. However, since a pressure reducing effect of distributing the pressing force of the intermediate rolls 6 can be obtained as long as no pressure reducing rolls 11 are arranged on the movement lines of the intermediate rolls 6 in an adjacent stage, the arranged positions of the pressure reducing rolls 11 can be set as appropriate depending on sludge properties.

Figure 5:
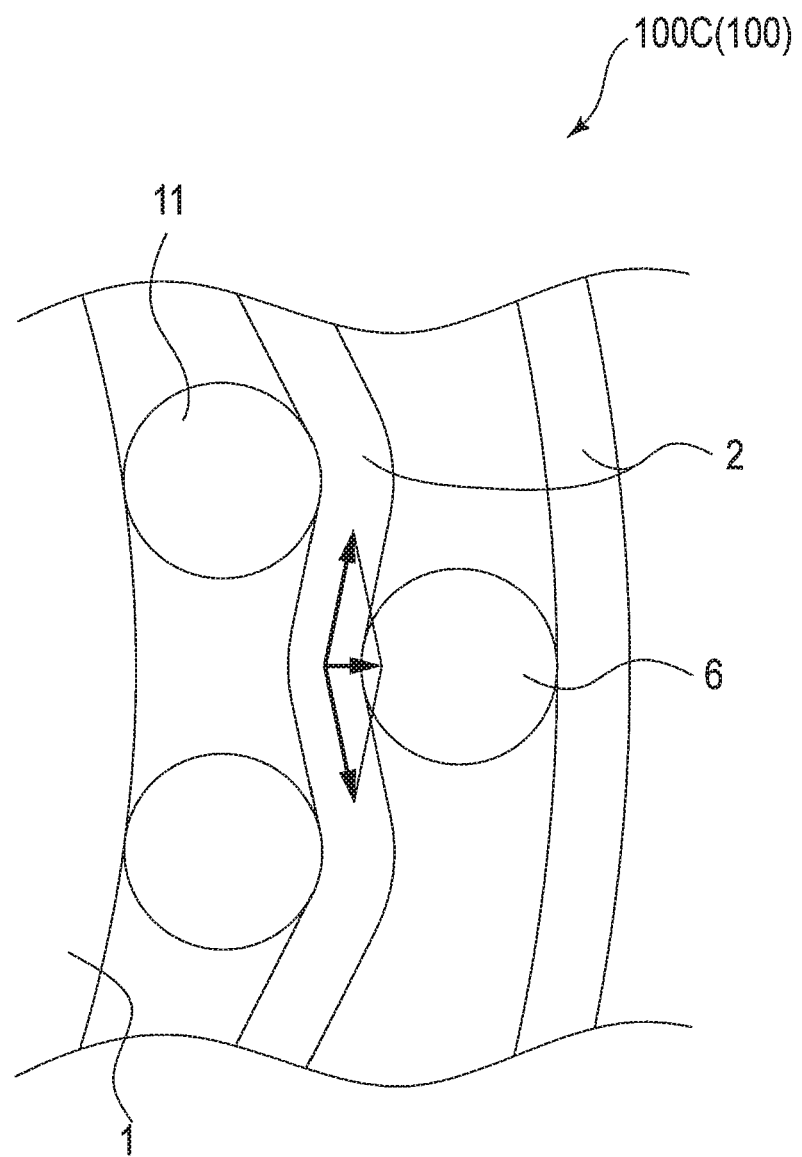
FIG. 5 is an enlarged view of a main portion of the double-wound low-pressure design type belt press in the third embodiment of the present invention.

FIG. 5 is an enlarged view of a main portion of the double-wound low-pressure design type belt press 100C in the third embodiment of the present invention. Unlike the structure of the normal double-wound belt press, the pressure reducing rolls 11 are arranged on the center roll 1 to prevent the pair of filter cloths 2, 2 from coming into contact with the center roll 1. Since the intermediate rolls 6 and the pressure reducing rolls 11 are arranged in zigzag, i.e. are arranged to be offset from each other's movement line, the pressing force transmitted from each intermediate roll 6 is distributed as illustrated by the arrows of FIG. 5, and no high linear pressure is applied to the pair of filter cloths 2, 2. Accordingly, in the squeezing stage SD, one portion of the pair of filter cloths 2, 2 comes into contact with the pressure reducing rolls 11 and the intermediate rolls 6 alternately, and is squeezed while receiving surface pressure. Arranging the pressure reducing rolls 11 as described above also enables dewatering at low pressure, and an operation of the belt press can be changed depending on sludge to be treated.

(Double-Wound Low-Pressure Gradual Increase Design)

Figure 6:
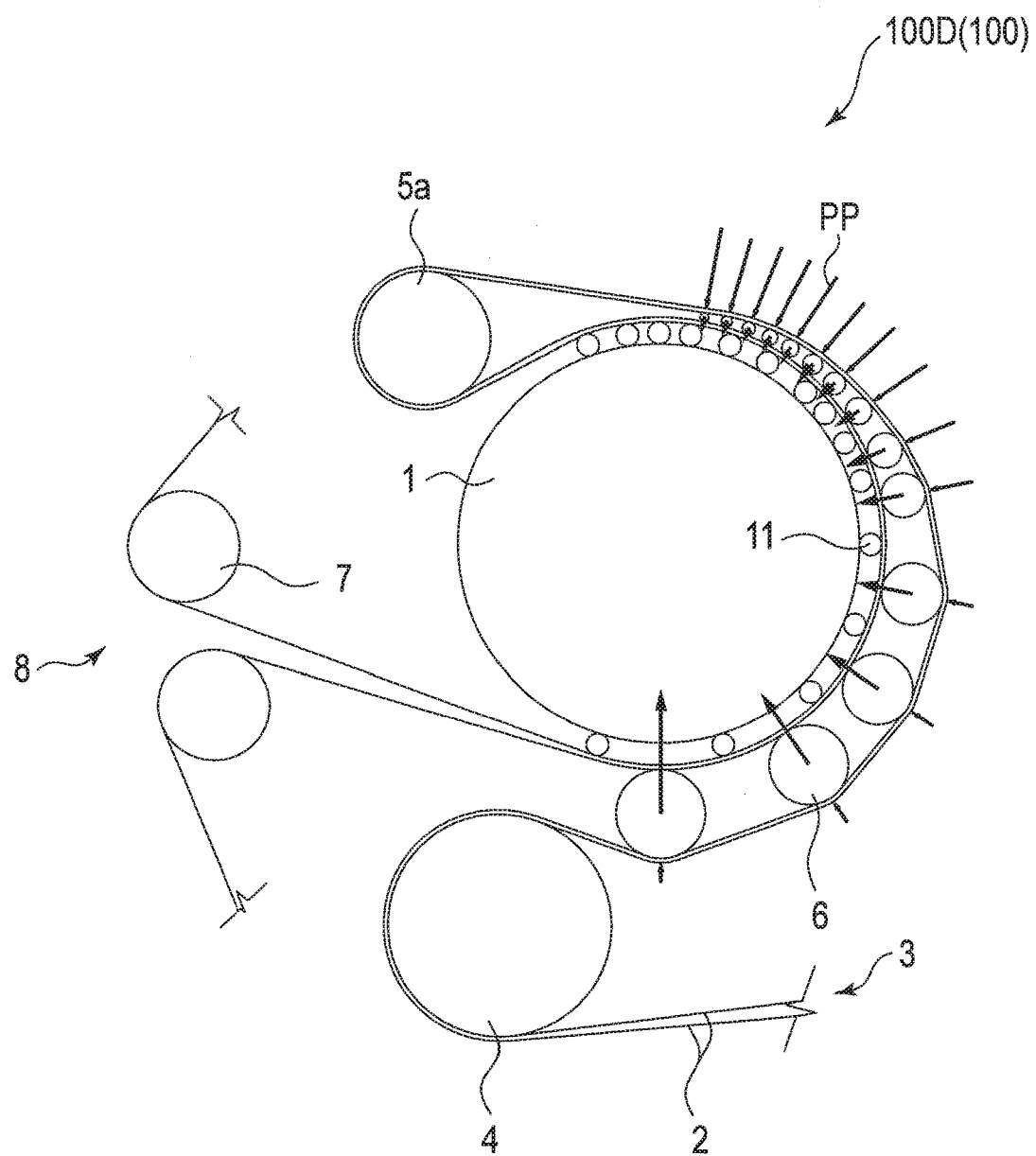
FIG. 6 is a side view of a main portion of a double-wound low-pressure gradual increase design type belt press in a fourth embodiment of the present invention.

FIG. 6 is a side view of a main portion of a double-wound low-pressure gradual increase design type belt press 100D in a fourth embodiment of the present invention. The belt press 100D has the same configuration as that in the first embodiment, except for the contents particularly described below. Moreover, dewatering stages include a filtering stage SA, a pressing stage SB, a returning stage SC, and a squeezing stage SD as in FIG. 2. The double-wound low-pressure gradual increase design type belt press 100D is combination of the double-wound pressure gradual increase type belt press 100B (FIG. 3) and the double-wound low-pressure design type belt press 100C (FIG. 4). Multiple pressure reducing rolls 11 are arranged between a center roll 1 and a pair of filter cloths 2, 2 which is contact with the center roll 1 in the aforementioned description, and the intermediate rolls 6 in contact with the pair of filter cloths 2, 2 in the squeezing stage SD are arranged such that the diameters and arrangement intervals of the rolls gradually increase toward the discharge portion 8.

The multiple pressure reducing rolls 11 are arranged between the pair of filter cloths 2, 2 and the center roll 1. Moreover, the multiple pressure reducing rolls 11 and the intermediate rolls 6 are arranged in zigzag to be offset from each other's movement line. Accordingly, in the squeezing stage SD, since the arrangement intervals of the intermediate rolls 6 gradually increase, the arrangement intervals of the pressure reducing rolls 11 in contact with the pair of filter cloths 2, 2 also gradually increase.

In the pressing stage SB, as in the double-wound pressure gradual increase type belt press 100B, surface pressure PP applied by the large intermediate roll 6 is small, and the surface pressure PP is gradually increased by decreasing the sizes of the intermediate rolls 6. In the returning stage SC, the pair of filter cloths 2, 2 is made to return as in the normal double-wound belt press. In the squeezing stage SD, one portion of the pair of filter cloths 2, 2 comes into contact with the pressure reducing rolls 11 and the intermediate rolls 6 alternately and receives the surface pressure PP. Although pressing force of the intermediate rolls 6 is distributed by the pressure reducing rolls 11, since the sizes of the intermediate rolls 6 gradually increase, the pressing force of the intermediate rolls 6 increases stepwise. Accordingly, although the pressure is lower than that in the double-wound pressure gradual increase type belt press 100B due to the pressure reducing rolls 11, dewatering in which the pressure gradually increases as in the double-wound pressure gradual increase type belt press 100B can be performed.

(Quadruple Wound)

Figure 7:
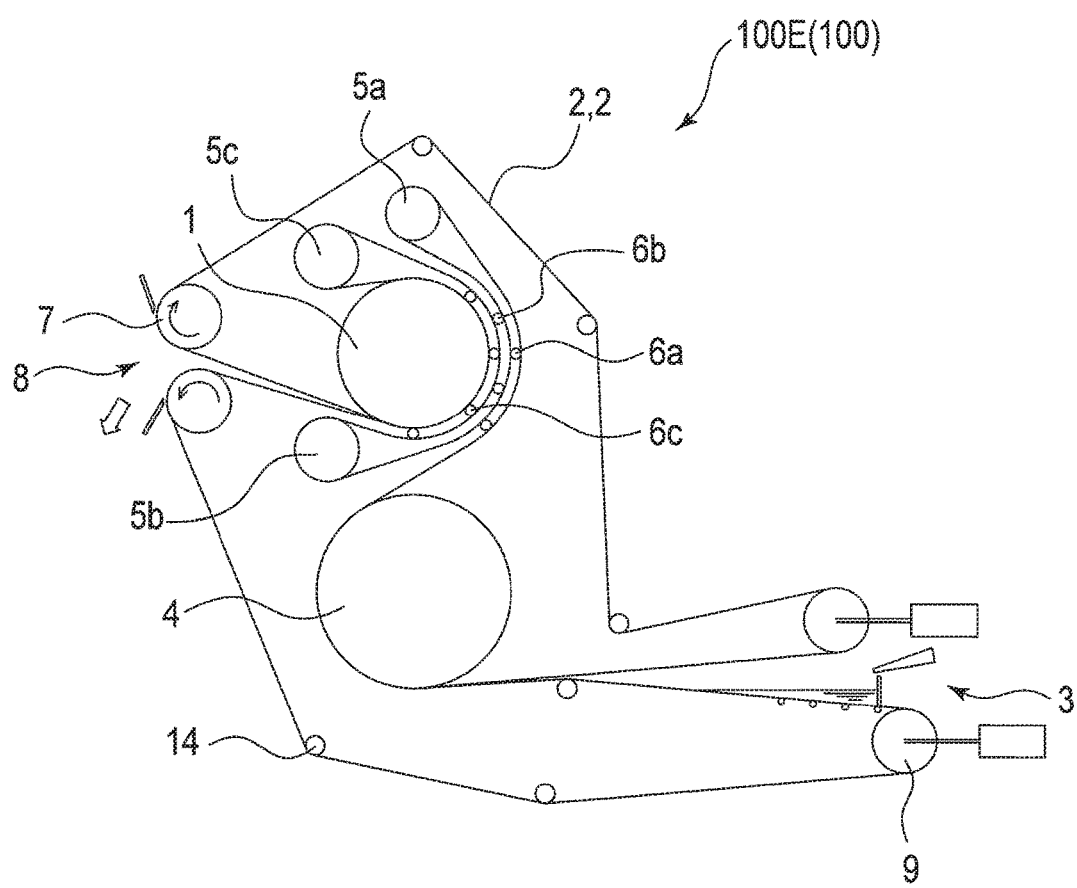
FIG. 7 is a schematic side view of a quadruple-wound belt press in a fifth embodiment of the present invention.

FIG. 7 is a schematic side view of a quadruple-wound belt press 100E in a fifth embodiment of the present invention. The belt press 100E has the same configuration as that in the first embodiment, except for the contents particularly described below. Moreover, dewatering stages include a filtering stage SA, a pressing stage SB, a returning stage SC, and a squeezing stage SD as in FIG. 2. The quadruple-wound belt press 100E in which a pair of filter cloths 2, 2 is wound around a center roll 1 four times includes: a sludge supplying portion 3 which supplies sludge; the pair of upper and lower endless filter cloths 2, 2 which holds the sludge therebetween and dewaters the sludge; the center roll 1 around which the pair of filter cloths 2, 2 is wound four times; a shear roll 4 which guides the pair of filter cloths 2, 2 to the center roll 1; return rolls 5a to 5c around which the pair of filter cloths 2, 2 is wound to return toward the center roll 1; intermediate members which are arranged between quadruple portions of the pair of filter cloths 2, 2 facing each other and traveling on the center roll 1; drive rolls 7, 7 which drive the pair of filter cloths 2, 2; a discharge portion 8 which discharges the sludge; and a tension roll 9 which adjusts the tension of the pair of filter cloths 2, 2. In the following description, intermediate rolls 6 are used as the intermediate members as in the aforementioned double-wound belt press.

The intermediate rolls 6 are arranged in three stages along a periphery of the center roll 1. The intermediate rolls 6 in the first stage from the outer side is referred to as intermediate rolls 6a, those in the second stage is referred to as intermediate rolls 6b, and those in the third stage is referred to as intermediate rolls 6c. The paired upper and lower endless filter cloths 2, 2 overlapping each other are wound around the shear roll 4, and then come into contact with the intermediate rolls 6a arranged in the periphery of the center roll 1 to be wound around the intermediate rolls 6a. The pair of filter cloths 2, 2 wound around the intermediate rolls 6a is then wound around the return roll 5a. The pair of filter cloths 2, 2 wound around the return roll 5a is then made to return toward the center roll and is wound around the intermediate rolls 6b arranged inside the intermediate rolls 6a. In this case, the pair of filter cloths 2, 2 is made to travel on the center roll 1 side of the intermediate rolls 6a. After the pair of filter cloths 2, 2 wound around the intermediate rolls 6b is similarly made to return by being wound around the return roll 5b, the pair of filter cloths 2, 2 is wound around the intermediate rolls 6c arranged inside the intermediate rolls 6b. Also in this case, the pair of filter cloths 2, 2 is made to travel on the center roll 1 side of the intermediate rolls 6b while being held by and between the intermediate rolls 6b and the intermediate rolls 6c. Then, the pair of filter cloths 2, 2 wound around the intermediate rolls 6c is wound around the return roll 5c to return and comes into contact with the center roll 1 to be wound therearound. The pair of filter cloths 2, 2 wound around the center roll 1 is made to travel on the center roll 1 side of the intermediate rolls 6c while being held by and between the intermediate rolls 6c and the center roll 1. The paired filter cloths 2, 2 in contact with the center roll 1 are separated from each other in the cake discharge portion 8, and are wound around the drive rolls 7, 7, respectively, to travel endlessly via guide rolls 14.

In the case where the pair of filter cloths 2, 2 is made to travel and the intermediate rolls 6a, 6b, and 6c are arranged to be movable along radial lines from the center of the center roll 1, the tension of the pair of filter cloths 2, 2 transmits pressing force to the pair of filter cloths 2, 2 traveling on the center roll 1 side, via the intermediate rolls 6a, 6b, and 6c.

The same intermediate members as those in the aforementioned double-wound belt press can be utilized as the intermediate members. In the case where the intermediate rolls 6 are utilized, the intermediate rolls 6a, 6b, and 6c in the stages are arranged in zigzag, i.e. arranged to be offset from each other's movement line to continuously apply surface pressure by the rolls. Note that aligning the movement lines of the intermediate rolls 6a, 6b, and 6c in the stages on the same lines allows linear pressure to be applied to the pair of filter cloths 2, 2 between the intermediate rolls 6, and high pressure can be also applied.

When traveling around the center roll 1, the pair of filter cloths 2, 2 travels, while performing dewatering, from outside positions where the pair of filter cloths 2, 2 is wound around the intermediate rolls 6a, 6b, and 6c toward the position where the pair of filter cloths 2, 2 is in contact with the center roll 1. Since the pair of filter cloths 2, 2 in the outer portion applies pressing force to the pair of filter cloths 2, 2 in an inner portion via the intermediate rolls 6a, 6b, and 6c, more pressing force from the pair of filter cloths 2, 2 in the outer portions is applied as the portion of the pair of filter cloths 2, 2 comes closer to the center roll 1 to come into contact therewith and high pressure is applied. Accordingly, the dewatering is performed such that the dewatering pressure gradually increases from low pressure to high pressure.

Hence, side leak which occurs when pressure is applied abruptly does not occur, and appropriate dewatering can be performed.

(Details of Quadruple Wound)

Figure 8:
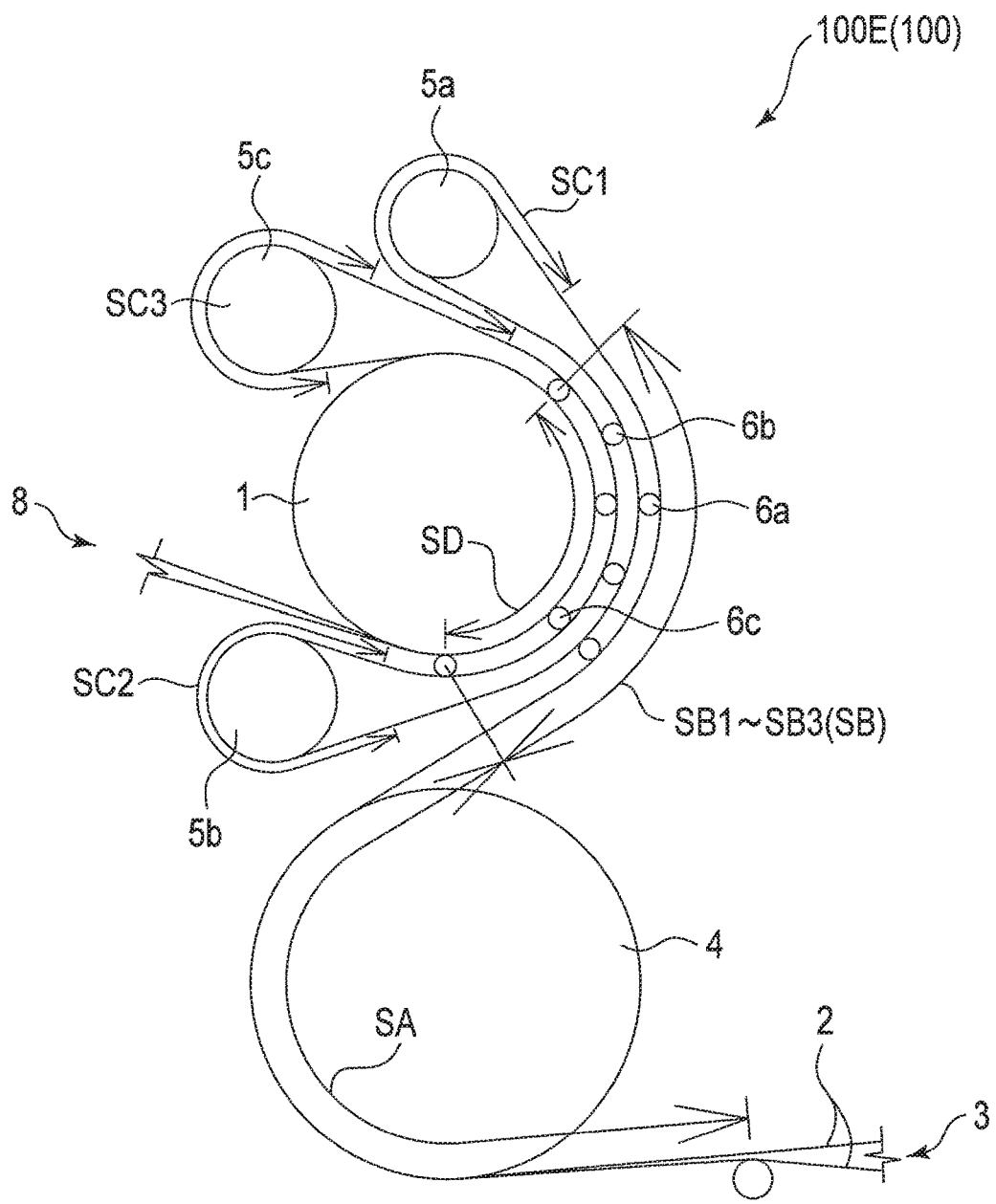
FIG. 8 is a side view of a main portion of the quadruple-wound belt press in the fifth embodiment of the present invention.

FIG. 8 is a side view of a main portion of the quadruple-wound belt press 100E in the fifth embodiment of the present invention. Dewatering stages of the quadruple-wound belt press 100E include a filtering stage SA, a pressing stages SB1, SB2, and SB3, returning stages SC1, SC2, and SC3, and a squeezing stage SD. The pair of filter cloths 2, 2 wound around the center roll 1 of the quadruple-wound belt press 100E is formed such that portions of the pair of endless filter cloths 2, 2 overlap one another, and the sludge is supplied between the filter cloths 2, 2 of the pair of filter cloths 2, 2.

In the filtering stage SA, the sludge supplied by a sludge supplying portion 3 is held by and between the filter cloth 2 and the filter cloth 2, and the pair of filter cloths 2, 2 is wound around the shear roll 4. Since the filter cloth 2 and the filter cloth 2 gradually come close to each other toward the shear roll 4, filtering is gradually performed also for sludge with high fluidity. Since the traveling speed of the filter cloth 2 traveling on the inner side out of the pair of filter cloths 2, 2 wound around the shear roll 4 is faster, shear force is generated inside. Accordingly, in the filtering stage SA, surface pressure produced by the shear roll 4 and the shear force of the filter cloth 2 and the filter cloth 2 are applied to the sludge, and liquid in the sludge is discharged outside through the pair of filter cloths 2, 2. The diameter of the shear roll 4 is set as appropriate according to a water content ratio and undiluted solution properties required in the squeezing stage SD which is the latter stage.

In the pressing stage SB, a stage in which the pair of filter cloths 2, 2 is wound around the intermediate rolls 6a is the pressing stage SB1, a stage in which the pair of filter cloths 2, 2 is wound around the intermediate rolls 6b is the pressing stage SB2, and a stage in which the pair of filter cloths 2, 2 is wound around the intermediate rolls 6c is the pressing stage SB3.

In the pressing stage SB1, the pair of filter cloths 2, 2 guided from the shear roll 4 is wound around the intermediate rolls 6a. Since the intermediate rolls 6a are arranged to be movable radially toward the center of the center roll 1, pressing force applied to the intermediate rolls 6a is transmitted to the pair of filter cloths 2, 2 in the pressing stage SB2 via the intermediate rolls 6a. In the pressing stage SB1, dewatering is performed by using tension acting on the pair of filter cloths 2, 2, shear force, and surface pressure produced by the intermediate rolls 6a.

In the returning stage SC1, the pair of filter cloths 2, 2 wound around the intermediate rolls 6a is wound around the return roll 5a and is made to return toward the intermediate rolls 6b. The pair of filter cloths 2, 2 wound around the return roll 5a from the outside thereof and folded back is made to travel inside the intermediate rolls 6a.

In the pressing stage SB2, the pair of filter cloths 2, 2 returning from the return roll 5a is wound around the intermediate rolls 6b. In addition to the tension acting on the pair of filter cloths 2, 2, the shear force, and the surface pressure produced by the intermediate rolls 6b, the surface pressure and the pressing force produced by the intermediate rolls 6a are applied to the sludge, and dewatering is performed at pressure higher than that in the pressing stage SB1.

In the returning stage SC2, the pair of filter cloths 2, 2 wound around the intermediate rolls 6b is wound around the return roll 5b and is made to return toward the intermediate rolls 6c. The pair of filter cloths 2, 2 wound around the return roll 5b from the outside thereof and folded back is made to travel inside the intermediate rolls 6b.

In the pressing stage SB3, the pair of filter cloths 2, 2 returning from the return roll 5b is wound around the intermediate rolls 6c. In addition to the tension acting on the pair of filter cloths 2, 2, the shear force, and the surface pressure produced by the intermediate rolls 6c, the surface pressure and the pressing force produced by the intermediate rolls 6b and the pressing force of the intermediate rolls 6a are applied to the sludge, and dewatering is performed at pressure higher than that in the pressing stage SB2.

In the returning stage SC3, the pair of filter cloths 2, 2 wound around the intermediate rolls 6c is wound around the return roll 5c and is made to return toward the center roll 1. The pair of filter cloths 2, 2 wound around the return roll 5c from the outside thereof and folded back is made to travel inside the intermediate rolls 6c.

In the squeezing stage SD, the pair of filter cloths 2, 2 returning from the return roll 5c is wound around the center roll 1 to come into contact therewith and is made to travel while being held by and between the center roll 1 and the intermediate rolls 6c. The pair of filter cloths 2, 2 receives surface pressure by being wound around the center roll 1. Furthermore, since the pressure force applied in the pressing stages SB1, SB2, and SB3 presses the intermediate rolls 6c, the surface force produced by the intermediate rolls 6c is also applied to the pair of filter cloths 2, 2. Since the squeezing is performed with the pressing force in the pressing stages SB1, SB2, and SB3 being directly transmitted to the filter cloth 2 in the squeezing stage SD, dewatering is performed in the squeezing stage SD at the highest pressure in the dewatering stages. Filtrate is discharged from gaps formed by the intermediate rolls 6 and a small gap between the center roll 1 and the intermediate rolls 6c. The paired filter cloths 2, 2 having passed the squeezing stage SD are separated from each other and wound around the drive rolls 7, respectively, to discharge cake, and are then wound around the guide rolls 14 to be endless.

(Quadruple-Wound Low-Pressure Type)

Figure 9:
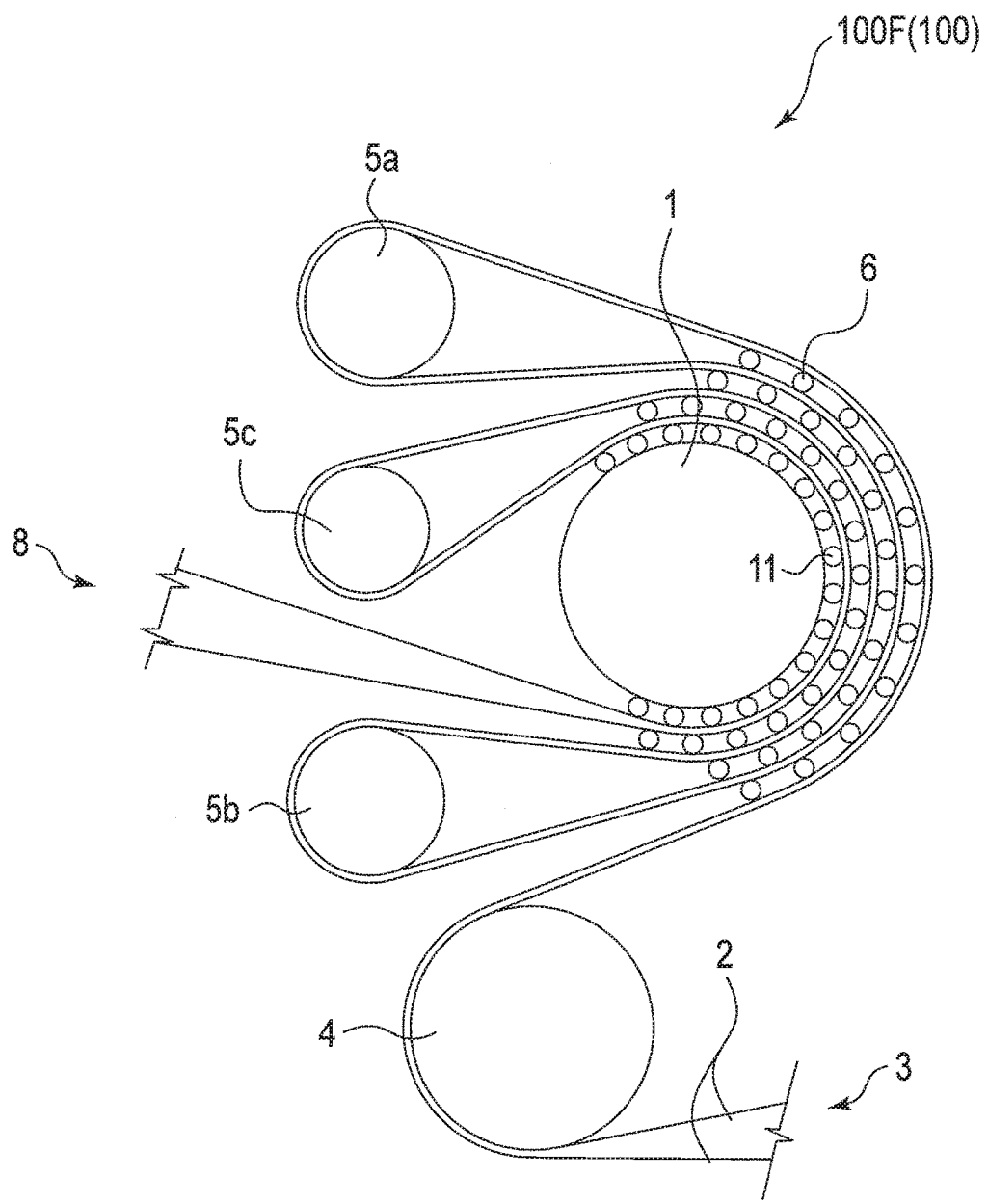
FIG. 9 is a schematic side view of a quadruple-wound low-pressure design type belt press in a sixth embodiment of the present invention.

FIG. 9 is a schematic side view of a quadruple-wound low-pressure design type belt press 100F in a sixth embodiment of the present invention. The belt press 100F has the same configuration as that in the first embodiment, except for the contents particularly described below. Moreover, dewatering stages include a filtering stage SA, pressing stages SB1 to SB3 (SB), returning stages SC1 to SC3, and a squeezing stage SD as in FIG. 8. The belt press 100F in which a pair of filter cloths 2, 2 is wound around a center roll 1 four times may have a configuration for a low-pressure design as in the aforementioned double-wound belt press. Multiple pressure reducing rolls 11 are arranged between a center roll 1 and the pair of filter cloths 2, 2 which is in contact with the center roll 1 in the above description. The pressure reducing rolls 11 are rotatably in contact with the center roll 1, and the pair of filter cloths 2, 2 is wound around the center roll 1 with the pressure reducing rolls 11 provided therebetween.

The pressure reducing rolls 11 and intermediate rolls 6 are arranged in zigzag, i.e. are arranged to be offset from each other's movement line. No high linear pressure such as pressure applied in the case where the pair of filter cloths 2, 2 is directly held by and between the pressure reducing rolls 11 and the intermediate rolls 6 is thereby applied to the pair of filter cloths 2, 2. Although the pair of filter cloths 2, 2 wound around the pressure reducing rolls 11 receives pressing force produced by the intermediate rolls 6, a portion of the pair of filter cloths 2, 2 receives surface pressure by coming into contact with the pressure reducing rolls 11 and the intermediate rolls 6 alternately. Since the pressing force is distributed by the pressure reducing rolls 11, squeezing pressure is lower than that in the normal quadruple-wound belt press.

Arranging the pressure reducing rolls 11 as described above enables dewatering at low pressure, and an operation of the belt press can be changed to an appropriate operation depending on the sludge to be treated. Moreover, although the pair of filter cloths 2, 2 is wound twice or four times in the belt press 100F in the sixth embodiment, a mode in which the pair of filter cloths 2, 2 is wound three times or more than four times can be employed.

(Frame)

Figure 10:
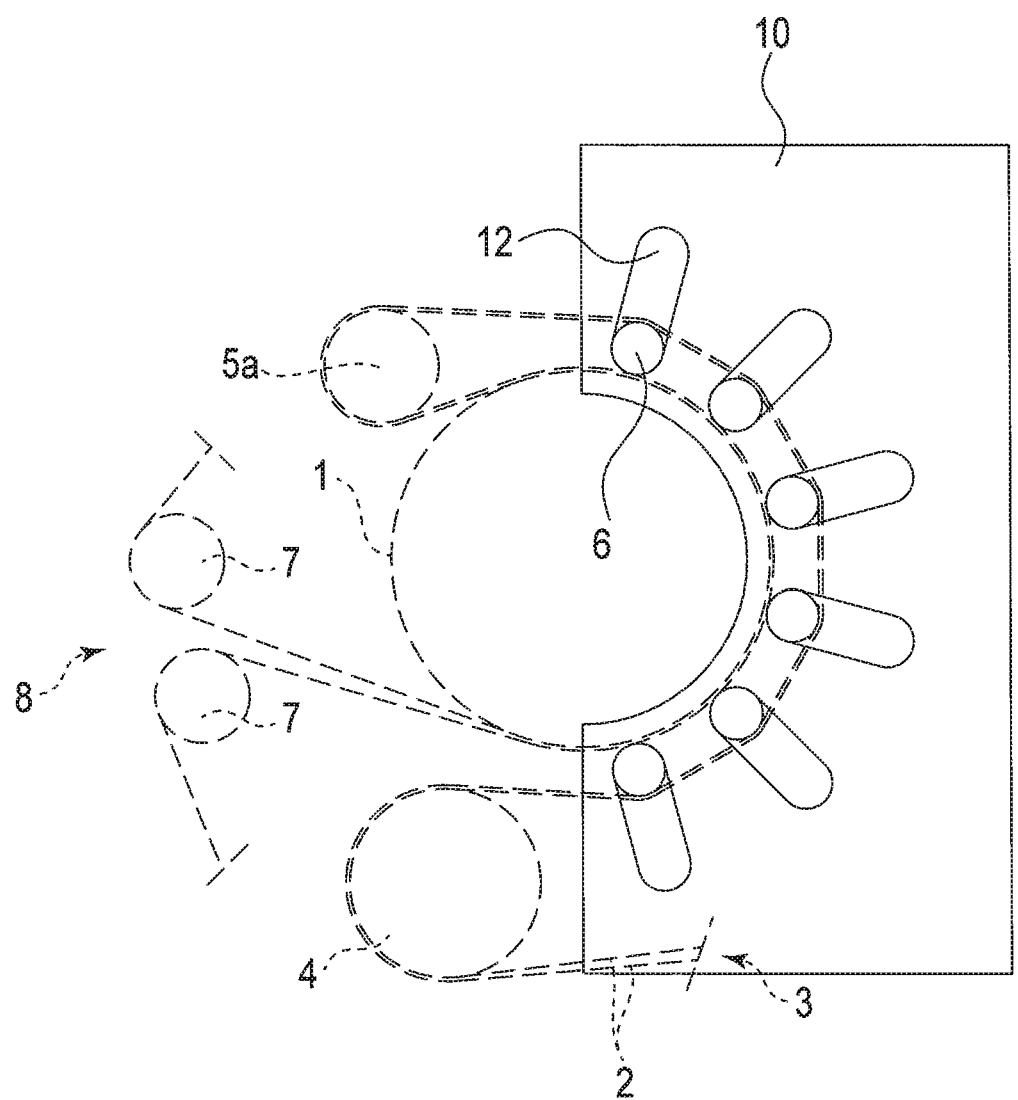
FIG. 10 is a side view of a frame supporting intermediate members of the belt press in the embodiments of the present invention.

FIG. 10 is a side view of the frame 10 supporting the intermediate members (for example, intermediate rolls) of the belt press 100 (100A to 100F) in the embodiments of the present invention. The frame 10 is provided to stand upright on left and right sides of the center roll 1 and is arranged in movable ranges of the intermediate members (for example, intermediate rolls 6) such that the intermediate members are movable along radial lines from the center of the center roll 1. The frame 10 has radial supporting holes 12 into which the intermediate members are inserted and by which the intermediate members are supported, and can support the intermediate members such that the intermediate members are insertable and movable along radial lines from the center of the center roll 1.

Although not illustrated, a similar frame 10 can be utilized in other modes of the belt press because the intermediate members can be supported only by forming corresponding supporting holes 12 in the frame 10. Moreover, the frame 10 can be also utilized as a frame supporting the pressure reducing rolls 11.

The frame 10 may be provided with protection plates to prevent the intermediate members from moving in an axial direction. Arranging the protection plates outside the frame 10 during an operation of the belt press 100 (100A to 100F) can prevent the intermediate members from being misaligned to the left or right due to meandering of the pair of filter cloths 2, 2 and from falling out from the supporting holes 12. Moreover, making the protection plates attachable and detachable can facilitate attachment and detachment of the intermediate members by detaching the protection plates in maintenance. Using transparent material such as acrylic glass enables immediate detection of failure of the intermediate members during an operation of the belt press 100 (100A to 100F). The frame 10 may be any frame as long as the frame can support the intermediate members. However, forming the frame 10 in a flat plate shape and providing openings around the axis of the center roll 1 as in the embodiment can achieve excellent workability in maintenance and the like.

Supporting the intermediate members by such a frame 10 allows pressing force from outside applied by the pair of filter cloths 2, 2 to be transmitted toward the center roll 1. Moreover, although the supporting holes 12 are formed in the radial shapes in the embodiment, the supporting holes 12 may be formed in any shapes such as radial curve shapes or parallel shapes, as long as the intermediate rolls 6 are supported to be capable of moving close to and away from the circumferential surface of the center roll 1.

The belt press 100 (100A to 100F) in the first to sixth embodiments of the present invention is a belt press in which the pair of filter cloths 2, 2 is wound around the center roll 1 multiple times, and pressure is thereby applied to the pair of filter cloths 2, 2 in a latter stage by pressing force of the pair of filter cloths 2, 2 wound in a former stage. High dewatering pressure can be obtained in the pair of filter cloths 2, 2 in the latter stage by winding the pair of filter cloths 2, 2 around one center roll 1 multiple times. Moreover, since sufficient dewatering time can be secured by using few rolls, the apparatus can be made compact. Since only few rolls are necessary, the length of the pair of filter cloths 2, 2 is shorter than that in the conventional technique, and the cost of consumables is suppressed. Hence, the belt press 100 is a dewatering machine suitable for high-pressure squeezing sludge treatment.

While the present invention has been described above based on the embodiments, the present invention is not limited thereto. The configurations of the respective parts can be replaced by any other configurations having the same functions.

The entire content of Japanese Patent Application No. 2013-217968 (filed: Oct. 21, 2013) is incorporated herein.

The invention claimed is:

1. A belt press comprising:
   a rotatable first roll;
   a rotatable second roll; and
   a pair of filter cloths wound travelably around the first roll and the second roll and configured to squeeze and dewater sludge supplied between filter cloths of the pair of filter cloths, wherein
   the pair of filter cloths is wound around the first roll a plurality of times by being wound around the first roll, then being wound around the second roll to return to a space between the first roll and the pair of filter cloths wound around the first roll, and being wound around the first roll again, and
   the pair of filter cloths wound around the first roll the plurality of times applies a pressing force to the first roll,
   the belt press further comprises a plurality of intermediate members arranged between portions of the pair of filter cloths wound around the first roll the plurality of times and being movable close to and away from a circumferential surface of the first roll,
   each of the plurality of intermediate members is a rotatable roll, and
   arrangement intervals between the plurality of intermediate members and roll diameters of the plurality of intermediate members gradually increase toward a discharge portion for discharging the sludge from the pair of filter cloths.

* * * * *